April 15, 1930.  W. A. HOURD  1,754,235

COLLAPSIBLE TOP

Filed May 6, 1927

INVENTOR.
Wilbert. A. Hourd.

BY Thos. Donnelly
ATTORNEY.

Patented Apr. 15, 1930

1,754,235

UNITED STATES PATENT OFFICE

WILBERT A. HOURD, OF DETROIT, MICHIGAN

COLLAPSIBLE TOP

Application filed May 6, 1927. Serial No. 189,287.

My invention relates to a new and useful improvement in a collapsible top adapted for use with vehicles and particularly with automobiles having seated rearwardly of the front seat, an auxiliary seat commonly known as a rumble seat.

It is an object of the present invention to provide a top which may be easily and quickly mounted on the rumble seat when moved to operative position and which, when moved to inoperative position, may be easily and quickly detached from the vehicle and folded into the compartment which is concealed by the rumble seat back.

Another object of the invention is the provision of a collapsible top of this class which will be simple in structure, economical of manufacture and highly efficient in use.

Other objects will appear hereinafter.

The invention consists in the combination and arrangement of parts hereinafter described and claimed.

The invention will be best understood by a reference to the accompanying drawings which form a part of this specification and in which, Fig. 1 is a fragmentary side elevational view of a vehicle body showing the invention applied.

Fig. 2 is a view taken on substantially line 2—2 of Fig. 3.

Fig. 3 is a view taken on substantially line 3—3 of Fig. 2.

Fig. 4 is a fragmentary sectional view taken on substantially line 4—4 of Fig. 2.

Fig. 5 is a fragmentary sectional view taken on substantially line 5—5 of Fig. 6 with the invention applied to a vehicle.

Fig. 6 is a fragmentary sectional view taken on substantially line 6—6 of Fig. 5.

Fig. 7 is an enlarged fragmentary side elevational view of the brace knuckle with a part shown in section.

Fig. 8 is an enlarged fragmentary side elevational view of a fastening device used in the invention.

In the drawing, I have illustrated the car body 11 provided with the cupola 12 positioned rearwardly of which is a rumble seat having a back 13 which is adapted to fold into the position shown in Fig. 1 when in operative position. A suitable brace 14 is connected to the back 13 to retain the same in elevated or operative position, as shown in Fig. 1. Projecting outwardly from the cupola are studs 15 upon which may be buttoned the loose end 16 of the cover 17. A frame board 18 is positioned beneath the cover 17 to retain the same elevated relatively to the fastening plate 19 which is provided with a plurality of loops 20.

The collapsible top comprises a frame having side brace bars at opposite sides, the construction at the opposite sides being similar, so that a description of the construction at one side will suffice for both.

These side braces consist of a rod 21 projecting outwardly from which is a hook 22 to engage in an eye hook 23 secured to the cupola 12. The opposite end of the rod 21 is threaded into a socket 24 which is connected by the link 25 to a socket 26 threaded into which is a rod 27, the opposite end thereof being hingedly connected as at 28 to a head 29, having the outwardly projecting arcuate arm 30 and connected to and depending downwardly from which is a support 31. Connected to head 29 hingedly is the cross bar 32, this connection of the cross bar being similar at both ends. A toggle brace 33 serves to retain the supports 31 at right angles to the cross bar 32. A pair of supports 31 is used and a brace bar 34 serves to connect these supports, the brace bar 34 having at each end the spring clips 35 and 36 which embrace the supports 31. Carried at the lower end of each of the supports is a projection 37 made from rubber or other noiseless material. Projected through each of the supports is a bolt 39 having the angularly turned end 40 adapted to project through an eyelet 41 on the seat back 13. A lever 42 is pivotally mounted on the bolt 39 and provided with a nose 43 engageable with the wear plate 44 seated in a recess 45 formed in the support. After engagement of the angularly turned portion 40 in the eyelet 41 a rocking of the lever 42 will effect a binding of the angularly turned portion 40 in the eyelet 41. The cover 46 is provided at one end with hooks 47 to engage the loops 20 and is fastened at its opposite end to buttons 48 so that it is retained in taut condition, the arcuate arms 30 serving as a frame for the side portions.

The mounting and collapsing of the top is believed evident, the supports 31 folding inwardly upon the cross bar 32 upon removal of the brace bar 34, and the rods 21 and 27 folding upon each other, as shown in dotted lines in Fig. 3.

In this manner I have provided a simple collapsible top adapted for this purpose which may be easily and quickly mounted and which is economical to manufacture and quite efficient and durable in use.

While I have illustrated and described the preferred form of my invention I do not wish to limit myself to the precise details of structure shown but desire to avail myself of such variations and modifications as come within the scope of the appended claim.

Having thus described my invention what I claim as new and desire to secure by Letters Patent is:

In a collapsible top adapted for use with a vehicle body having a cupola and a swingably mounted seat back rearwardly of said cupola, comprising: a bar extended transversely of said cupola and buckled intermediate its ends at spaced intervals to provide a plurality of loops; a frame mounted on said seat back; a cover mounted on said frame; and hooks mounted on the forward side of said cover for engaging in said loops.

In testimony whereof I have signed the foregoing specification.

WILBERT A. HOURD.